United States Patent [19]

Mariaulle

[11] 4,021,062
[45] May 3, 1977

[54] COUPLING ASSEMBLIES

[75] Inventor: Claude Mariaulle, Le Palais sur Vienne, France

[73] Assignee: Automatisation-Sogemo, Saint Junien, France

[22] Filed: Feb. 19, 1975

[21] Appl. No.: 551,115

[30] Foreign Application Priority Data

Mar. 15, 1974 France .................. 74.08914

[52] U.S. Cl. .................. 285/39; 285/104; 285/238; 285/340
[51] Int. Cl.² .................. F16L 17/02
[58] Field of Search ........... 285/39, 319, 315, 316, 285/322, 323, 33, 104, 105, 340, 238

[56] References Cited

UNITED STATES PATENTS

| 1,340,785 | 5/1920 | McMullin ............. 285/322 X |
| 1,817,776 | 8/1931 | Sipe ..................... 285/340 |
| 2,465,197 | 3/1949 | Chatham .............. 285/33 |
| 2,635,901 | 4/1953 | Osborn ................. 285/39 X |
| 3,019,284 | 1/1962 | Matthysse ............ 285/340 X |
| 3,447,819 | 6/1969 | Borsum et al. ....... 285/315 X |
| 3,569,903 | 3/1971 | Brishka ................ 285/319 |
| 3,653,689 | 4/1972 | Sapy et al. ........... 285/322 X |
| 3,879,065 | 4/1975 | Kobayashi ........... 285/340 X |
| 3,909,046 | 9/1975 | Legris .................. 285/323 X |

FOREIGN PATENTS OR APPLICATIONS

| 863,881 | 1/1953 | Germany ............. 285/340 |
| 1,024,537 | 3/1966 | United Kingdom .... 285/105 |

*Primary Examiner*—Thomas F. Callaghan
*Attorney, Agent, or Firm*—Larson, Taylor and Hinds

[57] ABSTRACT

A coupling assembly for connecting a conduit or tube to a member, comprising a retaining ring adapted to be fixed in a bore in the said member, a plurality of gripping teeth formed as extensions of the retaining ring and arranged to grip a conduit or tube inserted into the ring, and an unlocking ring fitting between the retaining ring and the conduit or tube and operable, on being pushed from outside, to spread the gripping teeth and thereby release the tube or conduit. The assembly is particularly useful for coupling rigid or semi-rigid plastics tubes to components of hydraulic or pneumatic installations.

17 Claims, 10 Drawing Figures

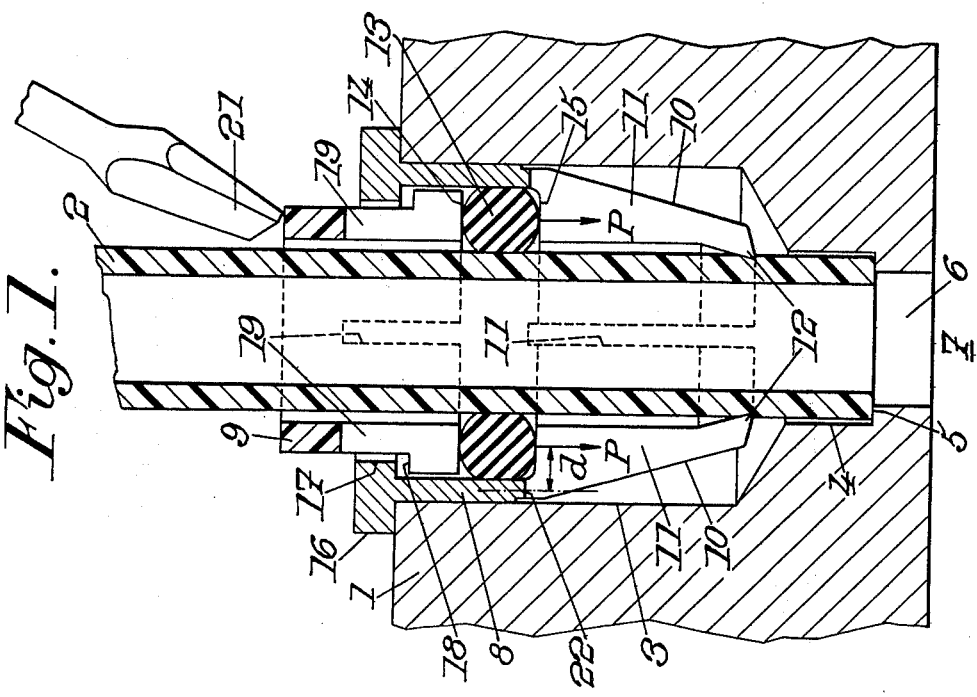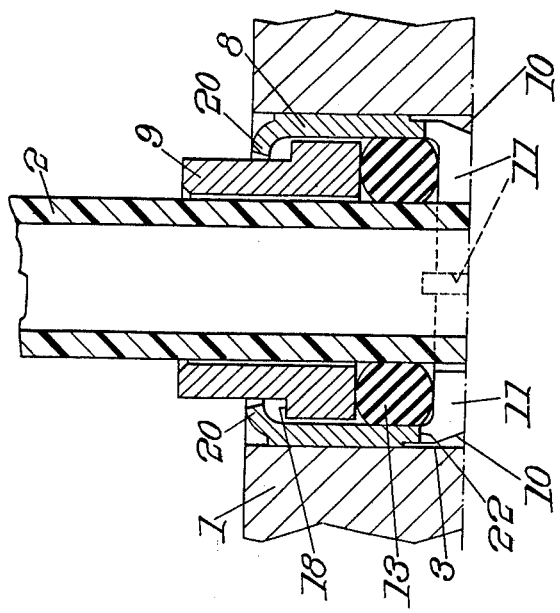

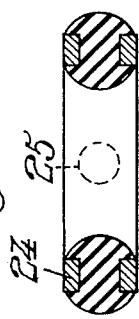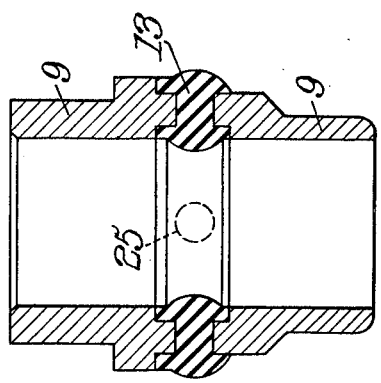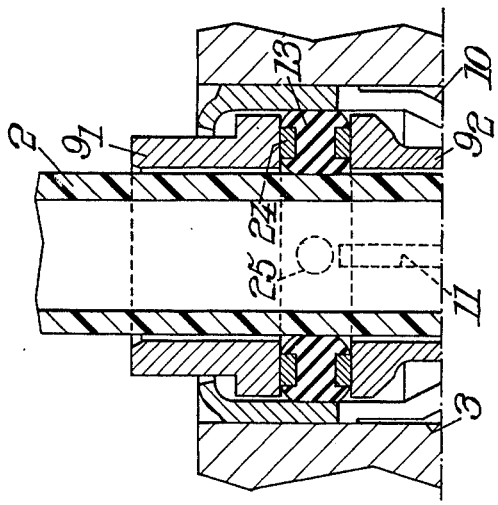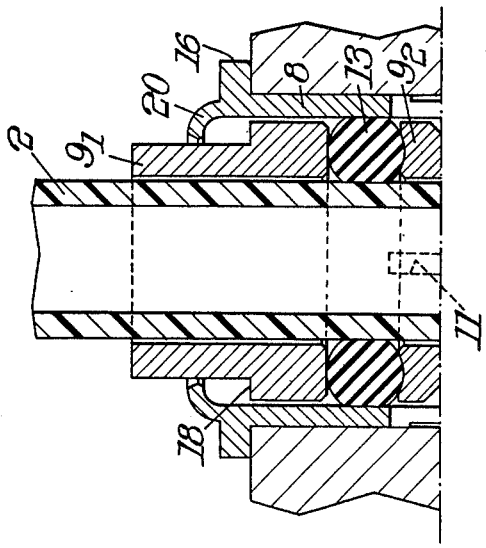

COUPLING ASSEMBLIES

This invention relates to coupling assemblies for conduits or tubes used to carry fluid (liquid, air, gas, etc.) More particularly, but not exclusively, the invention relates to coupling assemblies for semi-rigid plastics tubes or pipes, it being understood, however, that the invention can also be applied to copper or aluminum tubes. The invention concerns more especially, though not exclusively, coupling assemblies for use in hydraulic or pneumatic equipment for automatic operations, the said assemblies being used to make either joints between tubes or joints between the tubes and the pneumatic or hydraulic component parts of the said equipment.

Systems of this kind are already known, these systems comprising a coupling piece into a bore of which the conduit or tube to be connected is introduced to be held therein by the action of gripping teeth of a retaining element inserted in the gap between the bore and the tube, in co-operation with an unlocking ring adapted to release the said teeth and with a packing.

These systems are rather complex and therefore costly and, moreover, by reason of the manifold variety of lements to be provided, are bulky, because they make it necessary to adopt a relatively considerable internal diameter for the coupling piece.

Moreover, the resistance to pulling out is often not sufficient.

One object of the invention is to remedy these drawbacks and enable systems of this kind to be produced which are not bulky, not costly and capable of offering better resistance to pulling-out stresses.

The invention consists in a coupling assembly for connecting a conduit or tube to a member, comprising a retaining ring adapted to be fixed in a bore in the said member, a plurality of gripping teeth formed as extensions of the retaining ring and arranged to grip a conduit or tube inserted into the ring, and an unlocking ring fitting between the retaining ring and the conduit or tube and operable, on being pushed from outside, to spread the gripping teeth and thereby release the tube or conduit.

The unlocking force of the unlocking ring can be applied to the gripping teeth at a certain distance from the point where they merge with the retaining ring, thus creating a bending couple producing the opening of the teeth.

It is also possible, however, to arrange that the unlocking ring, or an extension thereof, will bear on the inclined portion of the teeth, in the proximity of their active portion, this solution requiring less pushing force for causing the opening of the teeth.

A packing ring may with advantage co-operate with the unlocking ring, it being understood, however, that it may if necessary be fitted independently of the assembly of the two rings.

The invention will now be described, by way of example, with reference to the accompanying drawings, in which:

FIG. 1 shows in partial axial section an assembly comprising a part of a hydraulic or pneumatic component and a coupling assembly in accordance with the invention;

FIGS. 2 to 8 show similarly coupling assemblies in accordance with other embodiments of the invention;

FIG. 9 shows in cross-section a packing ring included in the coupling of FIG. 8;

FIG. 10 shows in axial section the unlocking ring of the embodiment of FIG. 8.

Figure 2:
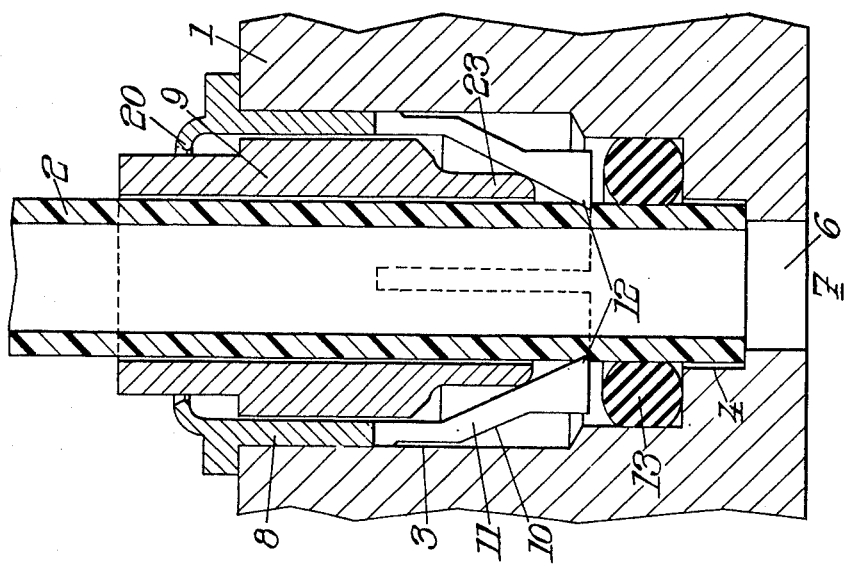

According to the invention, and more particularly according to that one of its mode of application and to those embodiments of its various parts to which it seems there is reason to give preference, it being proposed, for example, in an installation comprising equipment having hydraulic or pneumatic components, to ensure the connection of suitable conduits, in particular semi-rigid plastics tubes, with the parts of these components (it being understood that metal tubes may also be concerned), this is set about as follows or in a similar manner.

Considering, for example, a part 1 (FIG. 1) to which it is desired to connect a plastics tube 2, two bores 3 and 4 are formed in the said part, one bore 3 being adapted to receive the fixing ring to which reference will be made hereinafter, and the other 4 to receive the end of the tube 2, this abutting the edge 5, which the communicates at 6 with the interior 7 of the part 1;

and, in order to ensure the fixing of the tube 2, recourse is had essentially to two rings 8 and 9, namely:

a metal ring 8, for example of bronze or brase, adapted to be fixed in the bore 3 by setting it therein, cementing or other means, the said ring comprising, at the base of its solid portion present at the entrance of the bore, a certain number of teeth 10 separated by slots 11 and terminating in beaks 12 arranged so as to present themselves along a circular line having a diameter slightly smaller than the external diameter of the tube 2, and an unlocking ring 9 adapted to be introduced into the interior of the fixing ring 8 and to permit, being pushed towards the teeth 10, the spreading of these teeth, and therefore the unlocking or release thereof.

Provision is moreover made, in particular according to the embodiment of FIGS. 1 and 2, for interposing between the two rings a packing 13, which therefore assists in ensuring fluid-tightness between the tube 2 and the fixing ring 8 and which, moreover, in the embodiment of these Figures, ensures the transmission of the unlocking forces from the ring 9 to the teeth 10.

The said packing 13 bears, on the one hand, on the base 14 of the unlocking ring 9 and, on the other hand, on a bearing surface 15 provided approximately level with the point of attachment of the teeth 10 to the ring proper 8.

Finally, means are provided for ensuring the holding in position of the unlocking ring 9 in the fixing ring 8.

These means may be of various kinds.

Thus, in the embodiment of FIG. 1, in which it has been assumed that the ring 8 has a double shoulder 16, 17, one shoulder 16 serving as a support against the part 1 on the outside, the other shoulder 17 serving as a retaining means for the ring 9 which itself has a shoulder 18, it is expedient, in order to enable the ring 9 to be engaged on assembly, to make it deformable. This ring is therefore made of plastics material and is provided with slots 19, due to which it will be possible, on assembly, to reduce its dimensions temporarily to cause it to enter the interior of the bore in the shoulder 17, the said ring then resuming its shape.

It is also possible, however, to make the unlocking ring 9 of metal, as shown in FIG. 2, in which case the fixing ring 8 does not comprise an inner shoulder or assembly. In this instance, the said ring 8 is therefore introduced and then the ring 9, after which the ring 8 is turned down at 20 as shown in the said FIG. 2.

Whether the procedure according to FIG. 1 or that according to FIG. 2 is adopted, the operation of the assembly is as follows.

A unit forming a shell or cartridge and comprising the ring 8, the packing 13 and the ring 9 is assembled in the factory on an automatic machine. This cartridge is then supplied to the works fitting or hydraulic or pneumatic components for placing in position thereof. There is nothing more for the fitter to do then to insert the tube 2. It is then observed that the beaks or claws 12 penetrate into the material of the tube 8, resisting the extraction thereof when it is placed under pressure. The pressure moreover has the effect of compressing the packing 13, which likewise creates a reaction to pulling out of the tube.

For dismantling, a pressure force P is exerted on the unlocking ring 9 with the aid of a suitable tool 21. This force is transmitted to the bearing surface 15 of the teeth 10 and, as its point of application is at a certain distance $d$ from the edge 22 where the teeth are attached to the solid portion of the ring 8, this results in a bending couple which tends to spread the teeth and their beaks 12, thereby releasing the tube 2.

It will be observed, in any case, that the assembly is extremely simple, comprises only three elements and requires only two bores 3, 4 in the part 1.

It is understood that if it were a question of placing metal tubes 2, for example copper or aluminium tubes, in position, the claws 12 and their support could be made harder, for example of steel.

Starting from the embodiments which have just been described, many others can be devised, while remaining within the scope of the invention.

Figure 3:
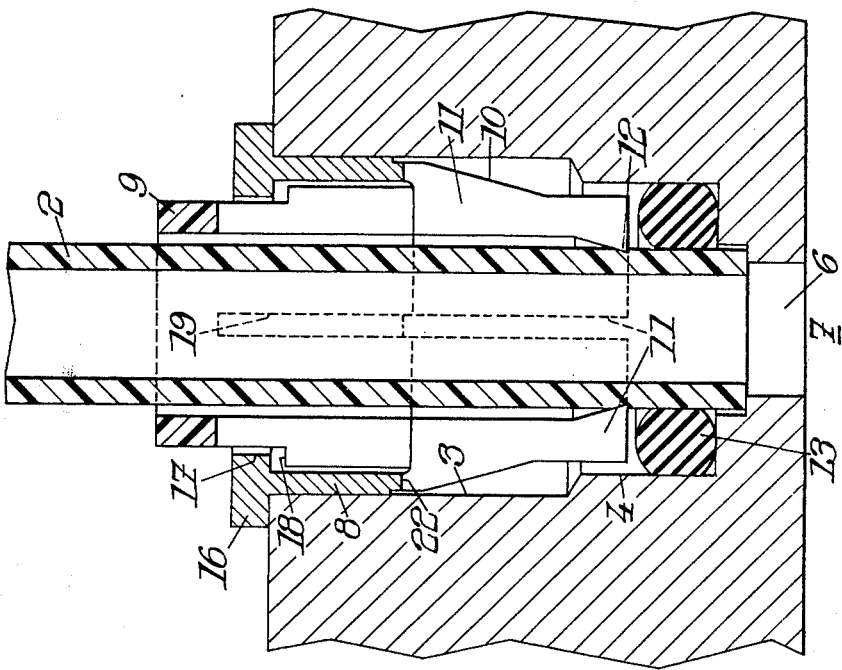

Thus, first of all, as illustrated in FIGS. 3 and 4, it is not necessary fo the packing 13 to be interposed between the two rings 8 and 9. It may be independent and disposed, for example, in the bore 4.

The unlocking ring can then be rested directly on the bearing surface 15 of the teeth 10, as shown in FIG. 3.

It is also possible, however, as shown in FIG. 4 (and also in the following Figures), to ensure contact of the unlocking ring 9 with the inclined portion of the teeth 10. In this case, it is no longer necessary to provide a bearing base such as 15 on the top of the teeth. The teeth then have throughout their height a thickness approximately equal to that of the solid portion of the ring 8 and this ensures that they have a greater flexibility.

In FIG. 4 it has been assumed that the ring 9 is made of metal, in a similar manner to the solution shown in FIG. 2, but this assumption is not limitativ e.

Contact with the teeth 10 is preferably made by a thinned-down portion 23, so that this contact may take place in a zone close to the beaks 12, which tends to reduce the unlocking force P.

Figure 5:
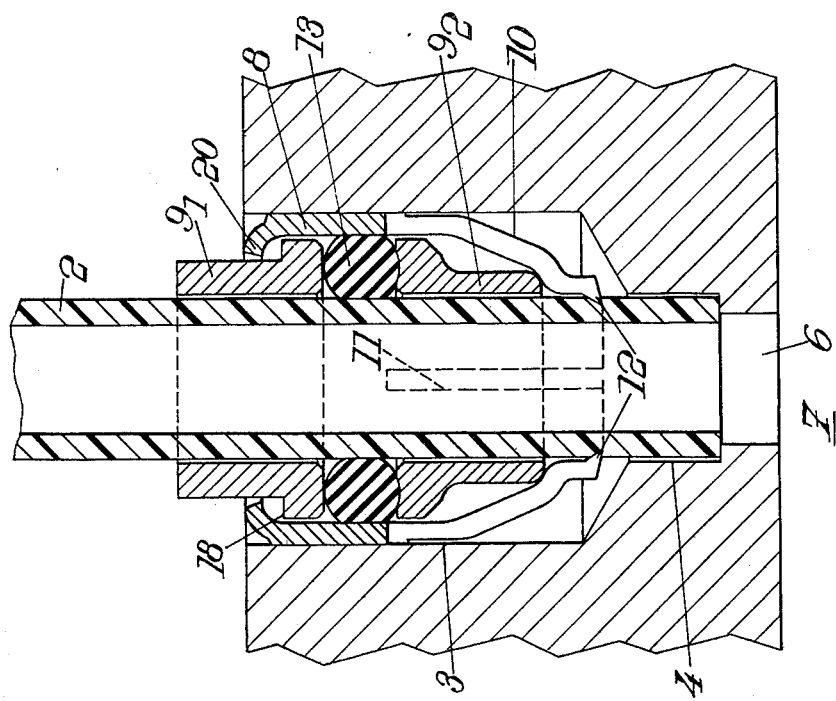

FIG. 5 illustrates another embodiment according to which the unlocking ring is composed of two elements $9_1$, $9_2$ between which the packing 13 is interposed, the element $9_2$, for example acting directly on the teeth 10, as already described hereinbefore with reference to FIG. 4. In the embodiment shown the element $9_1$ is made, for example, of plastic and slotted, for the introduction of the ring 8, while the element $9_2$ is made of metal.

It is then advisable to provide supplementary means for preventing excessive spreading of the teeth 10 being caused under an abnormal unlocking force exerted on the unlocking ring, which excessive spreading would contribute to the damaging of the teeth.

Thus, to this end, as indicated in the left-hand part of FIG. 5, it is possible to provide at the top of the teeth a bearing base 100 normally presenting itself with a clearance j opposite the corresponding shoulder 101 of the element $9_2$, this clearance being suitably calculated.

In accordance with a variant shown in the right-hand part of FIG. 5, it would also be possible to provide a stop tooth 200 on each tooth 10, still for the purpose of limiting the axial displacement of the ring $9_2$.

Figure 6:
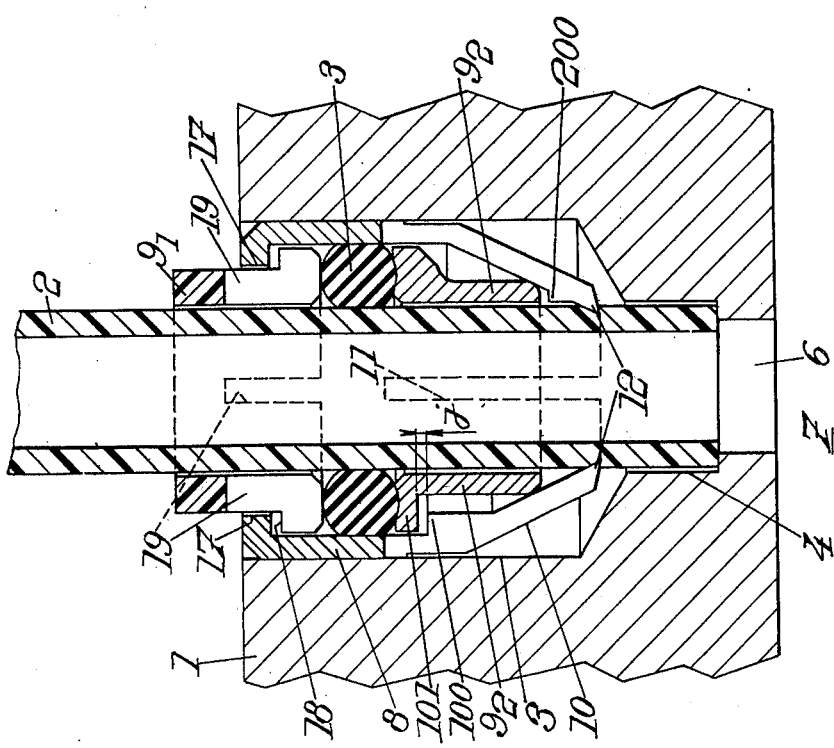

FIG. 6 illustrates a similar embodiment, but with both of the elements $9_1$, $9_2$ made of metal. Assembly is effected as in FIG. 2, the edge 20 being then bent over by crimping.

FIG. 7 is similar to FIG. 6, but there is a retaining collar 16 on the ring 8.

FIGS. 8 and 9 illustrate an embodiment similar to that of FIG. 5 or 6, but with the packing 13 moulded on a metal frame or reinforcement 24 arranged, for example, in the form of a ring pierced by holes 25. In this way, the unlocking force P is transmitted from one to the other of the elements $9_1$, $9_2$ without passing through the rubber of the packing, but through the medium of the said frame.

As shown in FIG. 10, the two elements $9_1$, $9_2$ may be replaced by a single ring 9 pierced by holes 25, with the packing moulded on to this ring opposite the said holes.

As a result of which, whatever the embodiment adopted, coupling systems can be produced the operation of which is sufficiently apparent from the foregoing for it to be unnecessary to dwell thereon, and which offer many advantages in comparison with the systems of the kind in question already in existence, in particular:

that of permitting rapid coupling by insertion of the tube, in particular a semi-flexible tube, in the interior of the aforesaid ring system, that of ensuring, in particular in the case where the toric or other packing is interposed between the two rings, perfect fluid-tightness over a part of the tube which has not been injured by the gripping teeth, that of only requiring, in the part to which the fixing may be effected, the presence of two bores, one having the diameter of the tube, the other the diameter of the fixing ring, that of comprising only parts which are simple and easy to machine, stamp or mould.

As is obvious and as is moreover already apparent from the foregoing, the invention is by no means limited to those modes of application and embodiments thereof which have been more especially considered; on the contrary, it covers all variants thereof.

I claim:

1. A coupling assembly for connecting a tube to a member having a bore and an opening into the bore through which the tube is to be inserted, comprising:
    a retaining ring, the outside diameter of at least a major portion of which is smaller than said opening such that the retaining ring is insertable through said opening into the bore said retaining ring being one integral piece which includes an elongated first portion which is adapted to be fixed to the bore and, a plurality of axially elongated gripping teeth formed as extensions from said elongated first portion of the retaining ring extending farther into the bore and radially, inwardly, said teeth including sharp ends for biting into a tube extending through the retaining ring and said teeth being naturally biased resiliently radially inwardly by an amount sufficient to exert a holding force on the tube opposing movement of the tube out of said opening, and an unlocking ring located radially inwardly of the retaining ring in an annular interval formed between the retaining ring and a tube extending therethrough, said unlocking ring being movable axially in said interval to exert a force against the teeth to spread said teeth to disengage them from the tube, said unlocking ring extending axially, in the direction away from the teeth, beyond the retaining ring, such that the unlocking ring is accessible outside of the retaining ring for moving the same axially to exert said force on the teeth to cause disengagement of the teeth from the tube, and including stop means on the unlocking ring and the retaining ring for preventing removal of the unlocking ring from the retaining ring, whereby the unlocking ring and the retaining ring are formed together as a single assembly.

2. An assembly according to claim 1, wherein the gripping teeth form at their junction with the retaining ring a bearing surface extending radially inwardly to receive the axial pressure of the unlocking ring, as it is pushed axially from outside, thereby to exert a torque on the teeth producing the spreading of the teeth.

3. An assembly according to claim 1, wherein there is provided a fluid-tight packing ring fitted in an axially extending space formed between the two said rings and positioned to transmit the pressure of the unlocking ring to the teeth.

4. An assembly according to claim 1, wherein the unlocking ring is made of deformable material and wherein said stop means comprises the structure wherein the unlocking ring is slotted so that, on deforming it, it can be inserted easily axially into the interior of the retaining ring which is formed with a retaining edge to hold the unlocking ring in position therein.

5. An assembly according to claim 1, wherein the unlocking ring is made of metal and is rigid, and the stop means comprises the structure wherein this ring is retained in the retaining ring by an edge of the retaining ring which is turned radially inwardly by crimping after insertion of the unlocking ring.

6. An assembly according to claim 1, wherein the teeth of the retaining ring are constituted by a slotted extension of the said ring disposed along the tube and the unlocking ring extends into the interior of this extension for the purpose of spreading the ends of the said teeth.

7. An assembly according to claim 1, wherein the unlocking ring is constituted by two aligned coaxial elements between which a packing ring is inserted.

8. An assembly according to claim 7, wherein that element of the unlocking ring which is disposed on the side of the packing ring where the teeth of the retaining ring are located acts on the teeth close to their ends which move into engagement with the tube.

9. An assembly according to claim 7, wherein the packing ring separating the two elements of the unlocking ring is provided with an annular reinforcing frame.

10. An assembly according to claim 7, wherein the two elements of the unlocking ring are separated by the packing ring and are integral therewith, the packing ring being moulded on to the said elements.

11. An assembly according to claim 1, said stop means including a portion of the retaining ring extending radially inwardly at a location thereon spaced axially from said gripping teeth, and a portion of the unlocking ring extending radially outwardly within said radially inwardly extending portion of the retaining ring.

12. An assembly according to claim 1, wherein the retainer ring is attached within said bore by gluing of the opening of the bore.

13. An assembly according to claim 1, wherein the retainer is attached to said bore by means of crimping on the edges of the opening of the bore.

14. A coupling assembly for connecting a tube to a member having a bore and an opening into the bore through which the tube is to be inserted comprising:

a retaining ring, the outside diameter of at least a major portion of which is smaller than said opening such that the retaining ring is insertable through said opening into the bore and adapted to be fixed to the base, a plurality of gripping teeth formed as extensions from said retaining ring extending farther into the bore and radially inwardly, said teeth being biased resiliently radially inwardly and including sharp ends for biting into a tube extending through the retaining ring to exert a holding force thereon opposing movement of the tube out of said opening, an unlocking ring located radially inwardly of the retaining ring in an annular interval formed between the retaining ring and tube extending therethrough, said unlocking ring being movable axially in said interval to extend a force against the teeth to spread said teeth to disengage from the tube, said unlocking ring extending axially, in the direction away from the teeth, beyond the retaining ring, such that the unlocking ring is accessible outside of the retaining ring for moving the same axially to exert said force on the teeth to cause disengagement of the teeth from the tube, and wherein the unlocking ring is constituted by two aligned co-axial elements between which a packing ring is inserted said packing ring sealingly engaging the retaining ring and the tube.

15. An assembly according to claim 14, wherein that element of the unlocking ring which is disposed on the side of the packing ring where the teeth of the retaining ring are located acts on the teeth close to their ends which move into engagement with the tube.

16. An assembly according to claim 14, wherein the packing ring separating the two elements of the unlocking ring is provided with an annular reinforcing frame.

17. An assembly according to claim 14, wherein the two elements of the unlocking ring are separated by the packing ring and are integral therewith, the packing ring being moulded on to said elements.

* * * * *